(12) United States Patent
Hayasaka

(10) Patent No.: US 11,907,002 B2
(45) Date of Patent: Feb. 20, 2024

(54) MODERATION FEELING ADDING APPARATUS

(71) Applicant: NIHON PLAST CO., LTD., Fujinomiya (JP)

(72) Inventor: Jotaro Hayasaka, Shizuoka (JP)

(73) Assignee: NIHON PLAST CO., LTD, Fujinomiya (JP)

( * ) Notice: Subject to any disclaimer, the term of this patent is extended or adjusted under 35 U.S.C. 154(b) by 0 days.

(21) Appl. No.: 17/847,217

(22) Filed: Jun. 23, 2022

(65) Prior Publication Data
US 2023/0023887 A1  Jan. 26, 2023

(30) Foreign Application Priority Data
Jul. 20, 2021 (JP) .................................. 2021-119570

(51) Int. Cl.
*G05G 5/06* (2006.01)
*G05G 1/08* (2006.01)
*B60H 1/00* (2006.01)

(52) U.S. Cl.
CPC ............. *G05G 5/06* (2013.01); *B60H 1/0065* (2013.01); *G05G 1/08* (2013.01); *G05G 2505/00* (2013.01)

(58) Field of Classification Search
CPC ...... G05G 5/06; G05G 5/065; G05G 2505/00; H01H 19/11
USPC ...................................................... 74/10.41
See application file for complete search history.

(56) References Cited

U.S. PATENT DOCUMENTS

| 2004/0149073 A1* | 8/2004 | Ruegenberg | B60Q 1/1469 |
| | | | 74/527 |
| 2012/0279841 A1* | 11/2012 | Nakajima | H01H 19/11 |
| | | | 200/564 |

FOREIGN PATENT DOCUMENTS

| DE | 4141110 A1 * | 6/1993 | ............... G05G 5/06 |
| DE | 4430922 A1 * | 5/1995 | ............. G05G 5/065 |
| JP | 2001-035306 | 2/2001 | |
| WO | WO-02093604 A1 * | 11/2002 | ........... B60Q 1/1469 |
| WO | WO-2011064953 A1 * | 6/2011 | ............. H01H 19/11 |

OTHER PUBLICATIONS

USPTO Machine Translation (retrieved from FIT database) of DE 4141110 A1, Bauer, Jun. 17, 1993. (Year: 2023).*
USPTO Machine Translation (retrieved from FIT database) of the Description of DE 4430922 A1, Buer et al., May 11, 1995. (Year: 2023).*

\* cited by examiner

*Primary Examiner* — Daniel D Yabut
(74) *Attorney, Agent, or Firm* — Amin, Turocy & Watson, LLP

(57) ABSTRACT

A base section can operate to one side and the other side in a predetermined direction. A contact section is attached to a spring and can be in contact with the base section. A holding section holds the spring. A wall portion faces the contact section in the predetermined direction, and generates a sound which becomes a moderation feeling by a collision between the wall portion and the contact section moved by a biasing force of the spring as a contact state between the contact section and the base section changes due to an operation of the base section. The holding section regulates a position of the spring at least in a predetermined direction. A clearance between the contact section and the wall portion is substantially equal on the one side and the other side in the predetermined direction.

4 Claims, 4 Drawing Sheets

MODERATION FEELING ADDING APPARATUS

TECHNICAL FIELD

The disclosure of Japanese Patent Application No. 2021-119570 filed on Jul. 20, 2021 including the specification, drawings and abstract is incorporated herein by reference in its entirety.

The present invention relates to a moderation feeling adding apparatus that adds a moderation feeling.

BACKGROUND ART

In the related art, an operation dial for setting an operation of a wind direction adjusting apparatus may be provided to adjust a wind direction of an air conditioning apparatus used for a vehicle such as an automobile. When the operation dial is operated at a predetermined location instructing the operation of the wind direction adjusting apparatus, it is possible to improve an operation feeling by adding a moderation feeling, that is, a clicking feeling.

As a moderation feeling adding apparatus for adding the moderation feeling to the operation dial, an apparatus equipped with a plunger having a spring arranged in a radial direction of rotation of the operation dial and a pin arranged at a distal end of the spring is known. In this apparatus, when the operation dial is operated at a predetermined location, the pin aligns with a groove portion formed in a support member that supports the operation dial, and the pin hits the support member by a biasing force of the spring. Therefore, a striking sound, that is, a moderation sound (click sound) is generated (see, for example, PTL 1).

CITATION LIST

Patent Literature

PTL 1
Japanese Patent Publication Laid-Open No. 2001-35306 (Pages 3 and 4 and FIGS. 1 to 5)

SUMMARY OF INVENTION

Technical Problem

However, in the above-mentioned moderation feeling adding apparatus, a clearance between the holding hole of the plunger and the plunger is reduced in order to support the spring so that the spring does not shift laterally due to sliding contact between the pin and the support member when the operation dial is rotated. Therefore, a diameter of the holding hole of the plunger is small, it is difficult to insert the plunger into the holding hole, and thus, it is not easy to assemble.

In addition, since the clearance between the plunger and the holding hole is small, it is difficult to obtain a sufficient stroke width of a swing motion when the plunger returns to a predetermined location after sliding with the support member by operating the operation dial, the striking sound generated by this swing motion is small, and a sufficient moderation feeling cannot be added.

The present invention has been made in view of such a point, and an object of the present invention is to provide a moderation feeling adding apparatus that is easy to assemble and can add a favorable moderation feeling.

Solution to Problem

According to claim 1, there is provided a moderation feeling adding apparatus including: an operation section that operates to one side and the other side in a predetermined direction; a spring; a contact section that is attached to the spring and capable of being in contact with the operation section; a holding section that holds the spring; and a wall portion that faces the contact section in the predetermined direction and generates a sound which becomes a moderation feeling by a collision between the wall portion and the contact section moved by a biasing force of the spring as a contact state between the contact section and the operation section changes due to an operation of the operation section, in which wherein the holding section regulates a position of the spring at least in the predetermined direction, and a clearance between the contact section and the wall portion is substantially equal between the one side and the other side in the predetermined direction.

In the moderation feeling adding apparatus according to claim 2, in the moderation feeling adding apparatus according to claim 1, the wall portion is a side wall of a hole portion where the spring and the contact section are disposed, and the holding section holds the spring in a substantially central portion of the hole portion.

In the moderation feeling adding apparatus according to claim 3, in the moderation feeling adding apparatus according to claim 1 or 2, the holding section is a recessed portion into which an end portion of the spring is inserted.

In the moderation feeling adding apparatus according to claim 4, in the moderation feeling adding apparatus according to claim 3, an opening side of the recessed portion is widened in a tapered shape toward a wall portion side.

In the moderation feeling adding apparatus according to claim 5, in the moderation feeling adding apparatus according to claim 1 or 2, the holding section is a projection portion inserted into an end portion of the spring.

Advantageous Effects of Invention

According to the moderation feeling adding apparatus of claim 1, while it is not necessary to bring the wall portion close to the spring and the contact section in order to hold the spring, an assembling space can be secured and assembling is easy. In addition, since a movement stroke of the contact section when the operation section operates to one side in the predetermined direction becomes substantially equal to a movement stroke when the operation section operates to the other side, in a sound which becomes a moderation feeling generated when the contact section collides with the wall portion, the sounds when the operation section moves to the one side and the other side in the predetermined direction are substantially uniform, and it is not necessary to bring the wall portion close to the contact section. Accordingly, it is possible to secure a stroke when the contact section collides with the wall portion and generate a loud sound, so that a favorable moderation feeling can be added.

According to the moderation feeling adding apparatus of claim 2, in addition to the effect of the moderation feeling adding apparatus according to claim 1, the clearance between the contact section and the wall portion can be easily set substantially equal on the one side and the other side in the predetermined direction which is an operating direction of the operation section.

According to the moderation feeling adding apparatus of claim 3, in addition to the effect of the moderation feeling adding apparatus according to claim 1 or 2, the spring can be easily assembled by simply inserting the end portion of the spring into the holding section.

According to the moderation feeling adding apparatus of claim 4, in addition to the effect of the moderation feeling adding apparatus according to claim 3, when the spring is attached to be held in the recessed portion, a tapered shape on an opening side of the recessed portion serves as a guide, and thus, the spring can be assembled more easily.

According to the moderation feeling adding apparatus of claim 5, in addition to the effect of the moderation feeling adding apparatus according to claim 1 or 2, the position of the spring can be regulated even when a periphery of the holding section is widened, and thus, the spring and the contact section can be assembled more easily.

DESCRIPTION OF EMBODIMENTS

Hereinafter, the first embodiment of the present invention will be described with reference to the drawings.

Figure 4:
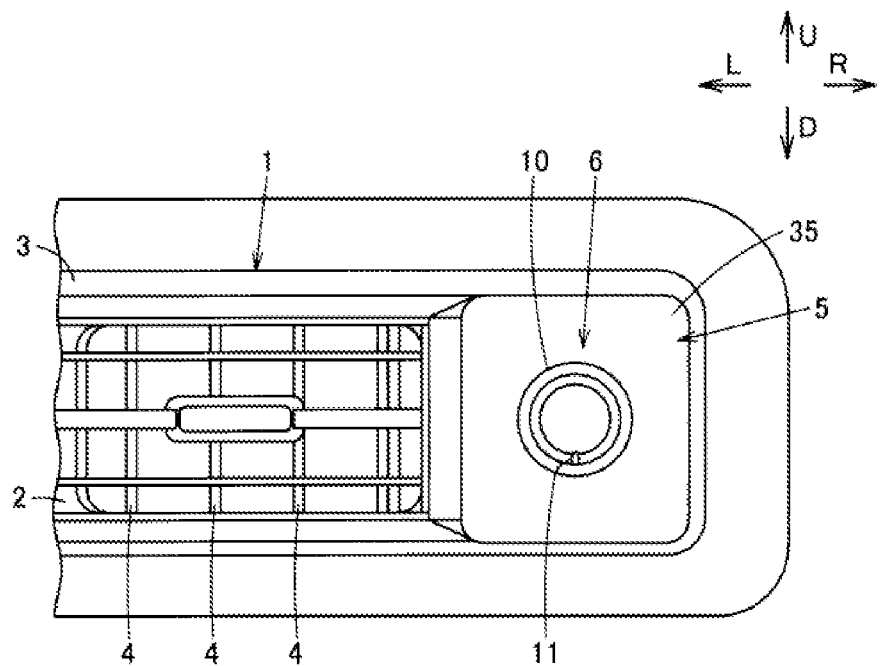
FIG. 4 is a perspective view showing an example of the operation apparatus.

In FIG. 4, a reference numeral 1 denotes a wind direction adjusting apparatus as an apparatus to be operated. The wind direction adjusting apparatus 1 is also called an air conditioning wind blowing apparatus, an air outlet, a ventilator, a register, or the like, and adjusts a wind direction to be blown in an air conditioning apparatus used for a vehicle such as an automobile. For example, the wind direction adjusting apparatus 1 is installed in each part of the vehicle such as an instrument panel part and a center console part. In the present embodiment, the wind direction adjusting apparatus 1 is arranged in front of an occupant in a vehicle interior as an example, and with reference to a direction seen from the vehicle interior, an arrow FR (FIG. 5) side is referred to as a front side, an arrow RR (FIG. 5) side is referred to as a rear side, an arrow L side is referred to as a left side, an arrow R side is referred to as a right side, an arrow U side is referred to as an upper side, and an arrow D side is referred to as a lower side. These directions are shown as an example only, and may be appropriately changed depending on an installation position and an installation direction of the wind direction adjusting apparatus 1.

The wind direction adjusting apparatus 1 includes a main body portion 3 having an outlet 2 for blowing out air-conditioned wind. In the present embodiment, the outlet 2 is formed laterally and is narrower in an up-down direction than in a right-left direction. A fin 4 which is a wind direction adjusting body is rotatably supported on the main body portion 3 to face the outlet 2. In the present embodiment, for example, the fin 4 includes a vertical fin that has an axial direction in the up-down direction and is rotatably supported by the main body portion 3, and a horizontal fin that has an axial direction in the right-left direction and is rotatably supported by the main body portion 3. The number and arrangement of fins 4 may be arbitrarily set. In addition, the wind direction adjusting apparatus 1 includes a moving section such as a shut valve.

In the wind direction adjusting apparatus 1, the operation of the moving section is set by the operation apparatus 5 operated by an operator such as the occupant. For example, in the wind direction adjusting apparatus 1, wind distribution performance is set by the operation apparatus 5. The operation apparatus 5 is arranged adjacent to the wind direction adjusting apparatus 1. In the present embodiment, the operation apparatus 5 is arranged on the right side of the wind direction adjusting apparatus 1.

Figure 3:
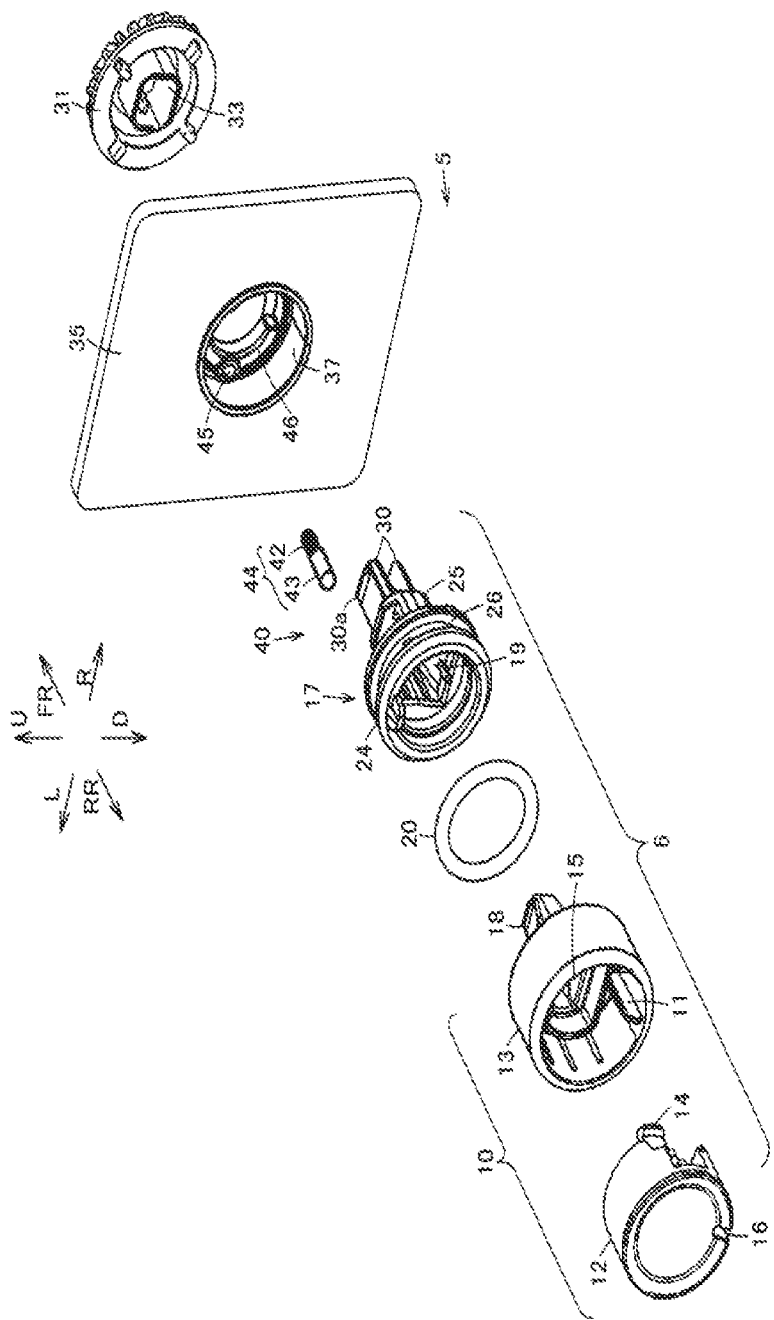
FIG. 3 is an exploded perspective view of an operation apparatus including the moderation feeling adding apparatus.

As shown in FIG. 3, the operation apparatus 5 has an operated section 6 operated by a user. The operated section 6 is a section that operates according to the operation of the user. In the present embodiment, the operated section 6 is a dial. That is, the operated section 6 of the present embodiment is rotated by the user. Further, the shown operated section 6 is an operation section that rotates according to the operation of the user. That is, the operated section 6 can be rotated between one side and the other side in the circumferential direction, which is a predetermined direction, by the operation. In the present embodiment, the operated section 6 has a rotation shaft along the front-rear direction, and can rotate around the rotation shaft in a clockwise direction which is the one side and in a counterclockwise direction which is the other side.

The operated section 6 has a knob section 10 to be picked or grasped by the user. Preferably, the knob section 10 is formed with a mark section 11 indicating an operation position or a designated position of the operated section 6. In the shown example, the knob section 10 is formed in a circular shape when viewed from the front, and the mark section 11 is arranged along the radial direction thereof.

In the present embodiment, the knob section 10 includes one knob member 12 and the other knob member 13.

One knob member 12 constitutes a design portion of the knob section 10. One knob member 12 is formed in a covered cylindrical shape, and is arranged so that a lid portion is located at a rear end portion.

Further, the other knob member 13 constitutes an outer shell portion or an outer peripheral portion of one knob member 12. The other knob member 13 is formed in a cylindrical shape, and one knob member 12 is inserted and attached from the rear to the inside. In the present embodiment, a claw portion 14 protrudes from a front portion of one knob member 12, the claw portion 14 is inserted into and hooked into an insertion hole portion 15 formed in the other knob member 13, and thus, one knob member 12 and the other knob member 13 are integrally connected. Further, in the present embodiment, the mark section 11 is formed as a rib along the radial direction and the axial direction on an inner peripheral portion of the other knob member 13, the mark section 11 is fitted into the groove portion 16 formed on the lid portion of one knob member 12, and thus, one knob member 12 and the other knob member 13 are aligned with each other, and the one knob member 12 is prevented from rotating with respect to the other knob member 13.

A base section 17, which is an operation section, is connected to the knob section 10. A connection portion 18 protrudes from a front portion of the other knob member 13 in the knob section 10, the connection portion 18 is inserted into and hooked to a receiving portion 19 formed in the base section 17, and thus, the knob section 10 and the base section 17 are integrally connected. A cushioning member 20 may be attached to the base section 17. The cushioning member 20 has elasticity and absorbs rattling during rotation of the operated section 6 to improve an operation feeling. As the cushioning member 20, for example, an O-ring is used.

Figure 2:
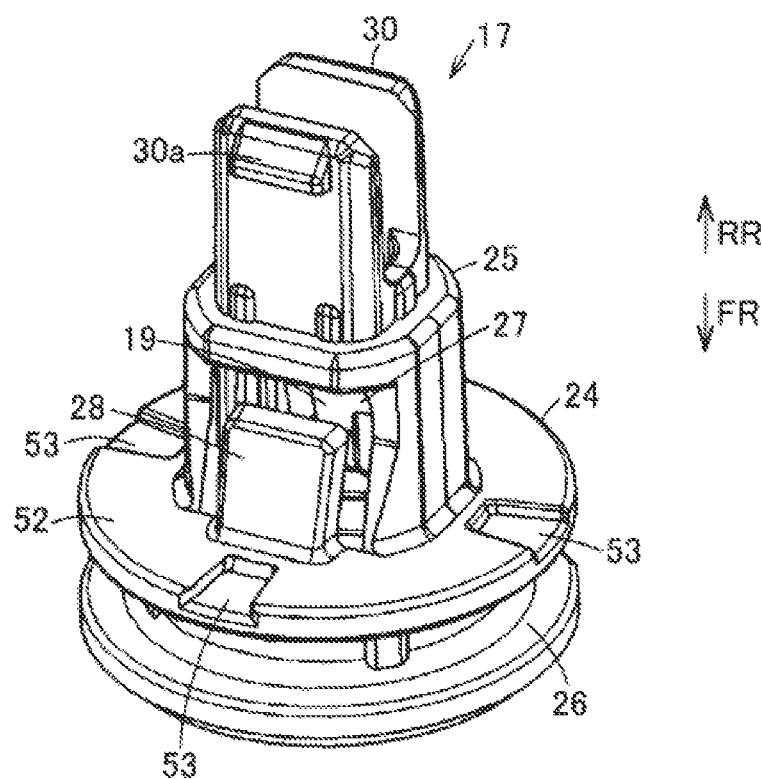
FIG. 2 is a perspective view showing a portion of the moderation feeling adding apparatus.

The base section 17 is a section that is operated, that is, moved or rotated by the operation of the operated section 6. In the present embodiment, the base section 17 can be operated to the one side and the other side in a circumferential direction (rotational direction) which is a predetermined direction, that is, in the clockwise direction and the counterclockwise direction, in accordance with the operation of the operated section 6. As shown in FIGS. 2 and 3, the base section 17 has a base section main body portion 24 and a protruding portion 25 formed in the base section main body portion 24.

In the present embodiment, the base section main body portion 24 is formed in a cylindrical shape. The protruding portion 25 is coaxially arranged on the front side of the base section main body portion 24, and protrudes forward from the base section main body portion 24. The receiving portion 19 is formed over the base section main body portion 24 and the protruding portion 25. A mounting groove portion 26 for receiving the cushioning member 20 is formed on an outer peripheral portion of the base section main body portion 24 forming an outer peripheral portion of the base section 17. A notch hole portion 27 is formed on a side portion of the protruding portion 25, and a hooking portion 28 on which the connection portion 18 of the knob section 10 is hooked is formed at the notch hole portion 27.

Further, in the present embodiment, the base section 17 further has a coupling section 30. The coupling section 30 is coupled to a conversion section 31 for transmitting the operation of the operated section 6 to the moving section such as a shut valve of the wind direction adjusting apparatus 1. The coupling section 30 is formed to protrude forward from a front portion of the protruding portion 25. In the shown example, the coupling section 30 is formed in the shape of two plates parallel to each other, and a coupling claw section 30a is formed at a distal end portion of the coupling section 30.

The conversion section 31 is a section that converts the operation of the operated section 6 into power for operating the moving section of the wind direction adjusting apparatus 1. The conversion section 31 is, for example, a gear meshed with a mechanism for operating the moving section of the wind direction adjusting apparatus 1. In the present embodiment, the conversion section 31 is a bevel gear. In a central portion of the conversion section 31, a coupling receiving section 33 into which the coupling section 30 is inserted and the coupling claw section 30a is hooked is formed.

The conversion section 31 and the operated section 6 are movably supported by a support section 35. The support section 35 supports the operated section 6 on the vehicle interior side, that is, the rear side which is the design side, and supports the conversion section 31 on the front side which is the opposite side thereof. As shown in FIG. 4, the support section 35 is a design panel fixed to the vehicle body side, and constitutes a design surface adjacent to the wind direction adjusting apparatus 1. Further, as shown in FIG. 3, the support section 35 is formed with an opening portion 37 penetrating in the front-rear direction. The operated section 6 is inserted into the opening portion 37 from the rear, and the operated section 6 is coupled to the conversion section 31 on the front side, which is a rear surface side of the support section 35. In the present embodiment, the base section 17 of the operated section 6 is inserted into the opening portion 37, and the knob section 10 is configured to be exposed and protrude rearward with respect to the support section 35. Further, in the present embodiment, the cushioning member 20 is in sliding contact with the opening portion 37 as the operated section 6 is operated.

The support section 35 may be printed or stamped with a mark indicating the operation of the moving section at a position designated by the mark section 11 located on the knob section 10 of the exposed operated section 6. The mark is arranged on the design surface of the support section 35, that is, on the outer side of the opening portion 37. For example, the mark includes a scale, a numerical value, a pictogram, and the like.

Then, in the present embodiment, a moderation feeling adding apparatus 40 that causes a moderation feeling (clicking feeling) is attached between the support section 35 and the operated section 6. The shown moderation feeling adding apparatus 40 generates a moderation feeling according to the position of the knob section 10 or the mark section 11 when the operated section 6 is operated. For example, the moderation feeling adding apparatus 40 generates the moderation feeling when the knob section 10 or the mark section 11 during operation of the operated section 6 is moved to a predetermined designated position. The moderation feeling adding apparatus 40 has a plunger 44 including a spring 42 and a contact section 43 attached to the spring 42.

The spring 42 is a coil spring in which a wire rod is wound in a coil shape. The contact section 43 is located on one end portion side of the spring 42 and is biased by the spring 42. The contact section 43 is formed of a member having a predetermined rigidity, such as metal or synthetic resin. Then, the plunger 44 is arranged in a hole portion 45 formed in the support section 35, and is located to face the front portion of the operated section 6.

Figure 1A:
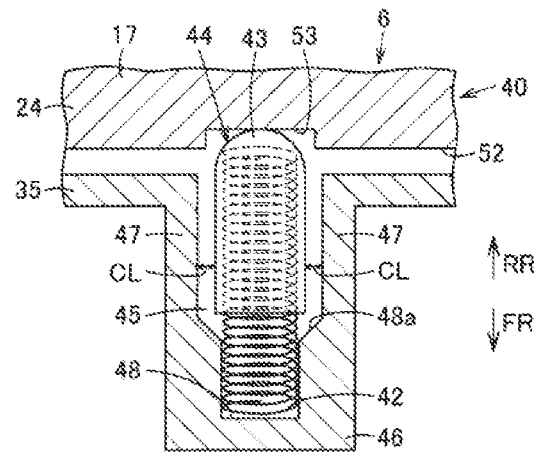
FIG. 1A is a cross-sectional view showing a moderation feeling adding apparatus according to a first embodiment of the present invention.
Figure 1B:
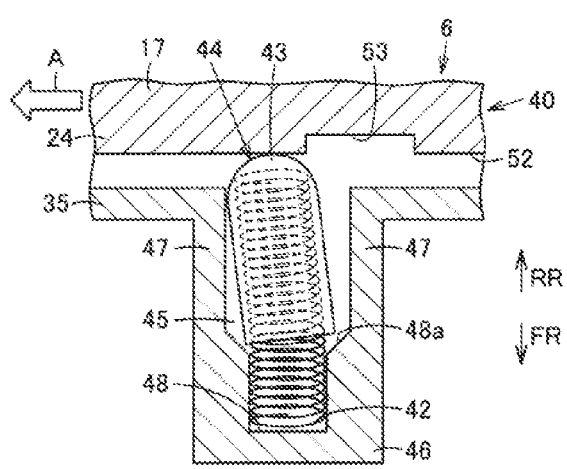
FIG. 1B is a cross-sectional view showing a state in which an operation section of the moderation feeling adding apparatus operates to one side in a predetermined direction.
Figure 1C:
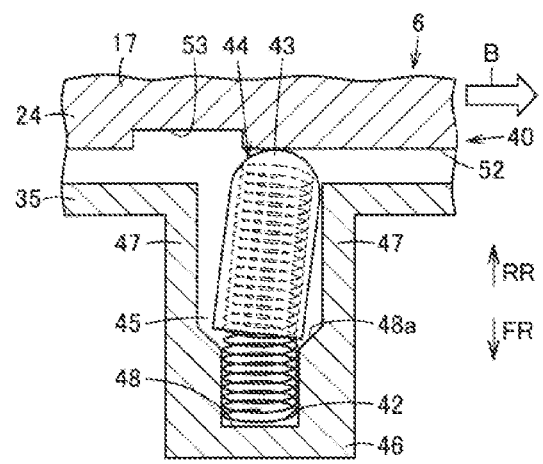
FIG. 1C is a cross-sectional view showing a state in which the operation section of the moderation feeling adding apparatus operates to the other side in a predetermined direction.

The hole portion 45 is formed in a support wall portion 46 protruding inside the opening portion 37 of the support section 35. The hole portion 45 is formed in the front-rear direction, a rear portion thereof is opened, and a front portion thereof is closed. As shown in FIGS. 1A to 1C, a wall portion 47, which is the side wall of the hole portion 45, is formed to extend in the front-rear direction. Therefore, the spring 42 and the contact section 43, that is, the plunger 44 are arranged to extend in a direction intersecting an operating direction of the base section 17, and are parallel to or substantially parallel to the rotation shaft of the base section 17. In the present embodiment, the hole portion 45 is formed in a circular shape when viewed from the front. Therefore, the wall portion 47 has a cylindrical shape. The wall portion 47 is a portion forming a portion of the support wall portion 46.

Further, inside the hole portion 45, a holding section 48 for holding the other end portion side of the spring 42, that is, the side opposite to the contact section 43 is formed. The holding section 48 is formed on the support wall portion 46 which is a bottom portion of the hole portion 45, and is located at a substantially central portion of the hole portion 45. The holding section 48 regulates the position of the spring 42 in the radial direction of the spring 42. That is, the spring 42 held by the holding section 48 is positioned without substantially changing the position of the held proximal end portion side. Therefore, the spring 42 is held by the holding section 48 so that the other end portion side thereof is held by the substantially central portion of the hole portion 45. Accordingly, the spring 42 is held so that the position of the other end portion side of the spring 42 does not move to at least the right-left direction in FIGS. 1A to 1C, that is, the one side and the other side in a predetermined direction which is the operating direction of the base section 17.

In the present embodiment, the holding section 48 is a recessed portion. The holding section 48 is a recessed portion having a circular shape when viewed from the front, having an inner diameter dimension smaller than an inner diameter dimension of the hole portion 45 and slightly larger than an outer diameter dimension of the spring 42. The holding section 48 is arranged coaxially with the hole portion 45. The holding section 48 holds the outer peripheral side of the other end portion of the spring 42. A rear side of the holding section 48, which is the opening side, is widened in a tapered shape toward the wall portion 47 side. That is, on the opening side of the holding section 48, a tapered surface 48a having a conical surface whose diameter gradually increases toward the rear side is formed. The tapered surface 48a is connected to the wall portion 47.

One end portion side of the spring 42 extends to the inside of the hole portion 45 at a position where the other end portion side thereof is held by the holding section 48. That is, at least one end portion side of the spring 42 can be elastically curved in the hole portion 45 in the radial direction. Further, the contact section 43 attached to the one end portion side of the spring 42 is located inside the hole portion 45 at the position where the other end portion side of the spring 42 is held by the holding section 48. That is, the side portion of the contact section 43 faces the wall portion 47 in the radial direction. As shown in FIG. 1A, the wall portion 47 has a predetermined clearance CL with respect to the contact section 43 in a state where the spring 42 is not curved. In the present embodiment, the wall portion 47 has a constant or substantially constant clearance CL with the contact section 43 over the entire circumference. That is, the clearance CLs are substantially equal to each other in at least the right-left direction in FIG. 1A, that is, on the one side and the other side in the predetermined direction which is the operating direction of the base section 17.

Further, the distal end portion of the contact section 43, that is, the end portion on the side opposite to the spring 42, protrudes rearward from the hole portion 45 and faces the operated section 6. In the present embodiment, the distal end portion of the contact section 43 protrudes rearward from the hole portion 45 and faces the front portion of the base section main body portion 24 of the base section 17 of the operated section 6. As shown in FIGS. 1A and 2, the front portion of the base section main body portion 24 is a flat facing surface portion 52 which is a general surface portion, and a concave groove portion 53 is formed in the facing surface portion 52. The contact section 43 is elastically pressed against the facing surface portion 52 of the base section 17 by the biasing of the spring 42.

The facing surface portion 52 faces the support wall portion 46 in the front-rear direction with the base section 17 of the operated section 6 inserted into the opening portion 37 of the support section 35. The facing surface portion 52 is a surface extending in the predetermined direction, that is, the circumferential direction, which is the operating direction of the base section 17 accompanying the operation of the operated section 6. Further, the facing surface portion 52 is a sliding contact section that is in sliding contact with the contact section 43 when the base section 17 is operated by the operation of the operated section 6. Therefore, the facing surface portion 52 is a biasing force accumulating section for storing the biasing force in the spring 42 by sliding contact with the contact section 43.

The concave groove portion 53 is a biasing force opening portion that releases at least a portion of the biasing force stored in the spring 42 by sliding contact between the facing surface portion 52 and the contact section 43 by the operation of the base section 17 by the operation of the operated section 6. The concave groove portion 53 is formed by offsetting a portion of the facing surface portion 52 rearward. The concave groove portion 53 is set according to the position indicated by the mark section 11 located on the knob section 10 of the operated section 6. In the present embodiment, a plurality of concave groove portions 53, for example, three are formed. Further, in the example shown in FIG. 2, the concave groove portions 53 are arranged at equal intervals or at equal angles in the circumferential direction which is the operating direction of the base section 17 (FIG. 3).

Next, the operation of the first embodiment will be described.

When assembling the moderation feeling adding apparatus 40, the plunger 44 having the contact section 43 attached to the end portion of the spring 42 is inserted into the hole portion 45 of the support wall portion 46 located in the opening portion 37 of the support section 35, and the end portion of the spring 42 opposite to the contact section 43 is held by the holding section 48. In this state, as shown in FIG. 1A, the contact section 43 is located in the substantially central portion of the hole portion 45 in a state where the spring 42 is upright, and substantially constant clearance CL is formed between the entire circumference of the contact section 43 and the wall portion 47.

Next, the operated section 6 configured by preliminarily assembling one knob member 12, the other knob member 13, the cushioning member 20, and the base section 17 shown in FIG. 3 is assembled to the opening portion 37 from the rear with respect to the support section 35 in which the plunger 44 is attached to the hole portion 45, and the conversion section 31 is coupled to the coupling section 30 of the operated section 6 from the front with the support section 35 interposed therebetween.

In this state, as shown in FIG. 1A, the base section 17 of the operated section 6 faces the contact section 43 in the front-rear direction, the base section 17 and the contact section 43 are in contact with each other at the facing surface portion 52 or the concave groove portion 53, and thus, the moderation feeling adding apparatus 40 is configured, and the operation apparatus 5 shown in FIG. 4 is assembled.

When setting the operation of the wind direction adjusting apparatus 1, in a case where the user rotates the knob section 10 of the operated section 6 of the operation apparatus 5, the entire operated section 6 rotates, the conversion section 31 (FIG. 3) coupled to the operated section 6 is rotated in conjunction with the operated section, and thus, the operation of the operated section 6 is converted into the power for operating the moving section of the wind direction adjusting apparatus 1 by the conversion section 31 (FIG. 3), and the wind direction adjusting apparatus 1 is driven by the set operation.

When the operated section 6 is rotated, in the moderation feeling adding apparatus 40 shown in FIG. 1A, the contact section 43 is in sliding contact with the facing surface portion 52. For example, when the base section 17 is moved by the rotation of the operated section 6 to the one side which is the left in the drawing, that is, in a direction indicated by an arrow A in FIG. 1B, the distal end portion of the contact section 43 is pressed toward the arrow A side by the sliding contact between the contact section 43 and the facing surface portion 52, and the position of the other end portion side of the spring 42 on the arrow A side is regulated by the holding section 48 and hardly moves. Accordingly, one end portion side of the spring 42 is bent in the direction of the arrow A in the clearance CL with the wall portion 47 of the hole portion 45, and the biasing force is accumulated in the spring 42. Then, when the operated section 6 reaches a predetermined position such as a position in which the mark section 11 indicates the operation of the moving section of the wind direction adjusting apparatus 1, the contact section 43 reaches the position of the concave groove portion 53 of the base section 17 set according to the predetermined position, and thus, at least a portion of the biasing force stored in the spring 42 is released, and the contact section 43 swings in the direction opposite to the arrow A. As a result, the contact section 43 collides with the wall portion 47 on the side opposite to the arrow A side of the hole portion 45, and a striking sound, that is, a moderation sound (click sound) is generated. Further, the position of the operated section 6 is temporarily fixed at a predetermined position by the distal end portion side of the contact section 43 entering the concave groove portion 53.

Similarly, when the base section 17 is moved by the rotation of the operated section 6 to the other side which is the right in the drawing, that is, in a direction indicated by an arrow B in FIG. 1C, the distal end portion of the contact section 43 is pressed toward the arrow B side by the sliding contact between the contact section 43 and the facing surface portion 52, and the position of the other end portion side of the spring 42 on the arrow B side is regulated by the holding section 48 and hardly moves. Accordingly, one end portion side of the spring 42 is bent in the direction of the arrow B in the clearance CL with the wall portion 47 of the hole portion 45, and the biasing force is accumulated in the spring 42. Then, when the operated section 6 reaches the predetermined position such as the position in which the mark section 11 indicates the operation of the moving section of the wind direction adjusting apparatus 1, the contact section 43 reaches the position of the concave groove portion 53 of the base section 17 set according to the predetermined position, and thus, at least a portion of the biasing force stored in the spring 42 is released, and the contact section 43 swings in the direction opposite to the arrow B. As a result, the contact section 43 collides with the wall portion 47 on the side opposite to the arrow B side of the hole portion 45, and a striking sound, that is, a moderation sound (click sound) is generated. Further, the position of the operated section 6 is temporarily fixed at a predetermined position by the distal end portion side of the contact section 43 entering the concave groove portion 53.

As described above, according to the first embodiment, in the moderation feeling adding apparatus 40, at least the position of the spring 42 on the one side and the other side in the predetermined direction (rotational direction) which is the operating direction of the base section 17 is regulated by the holding section 48. Therefore, while it is not necessary to bring the wall portion 47 close to the spring 42 and the contact section 43 in order to hold the spring 42, that is, it is not necessary to narrow the hole portion 45 into which the spring 42 and the contact section 43 (plunger 44) are inserted, an assembling space can be secured and assembling is easy.

Further, since the clearance CL between the contact section 43 and the wall portion 47 is set substantially equal on the one side and the other side in the predetermined direction (rotational direction) which is the operating direction of the base section 17, a movement stroke of the contact section 43 when the base section 17 operates to the one side in the predetermined direction becomes substantially equal to a movement stroke when the base section 17 operates to the other side. Therefore, in a striking sound which becomes the moderation feeling generated when the contact section 43 collides with the wall portion 47 due to the release of the biasing force of the spring 42 in a case where the contact state between the contact section 43 and the base section 17 changes, such as when the contact section 43 moves relatively from the facing surface portion 52 to the concave groove portion 53, the striking sounds when the base section 17 moves to the one side and the other side in the predetermined direction are substantially uniform, and it is not necessary to bring the wall portion 47 close to the contact section 43. Accordingly, it is possible to secure a stroke when the contact section 43 collides with the wall portion 47 and generate a loud striking sound, so that a favorable moderation feeling can be added.

The wall portion 47 is used as the side wall of the hole portion 45 accommodating the contact section 43, and the spring 42 is held in the substantially central portion of the hole portion 45 by the holding section 48. Accordingly, the clearance CL between the contact section 43 and the wall portion 47 can be easily set substantially equal in the predetermined direction which is the operating direction of the base section 17, and in the present embodiment, the one side and the other side in the rotational direction.

The holding section 48 is formed of a recessed portion which the end portion of the spring 42 is inserted, and thus, the spring 42 can be easily assembled by simply inserting the end portion of the spring 42 into the holding section 48.

Since the opening side of the holding section 48, which is a recessed portion, is widened in a tapered shape toward the wall portion 47, the tapered shape (tapered surface 48a) on the opening side of the holding section 48 serves as a guide when the spring 42 (plunger 44) is attached to be held by the holding section 48, and thus, the spring 42 (plunger 44) can be assembled more easily.

Further, when the operated section 6 is operated by the moderation feeling adding apparatus 40, the moderation feeling is generated at a predetermined position, and thus, the user can know the position of the operated section 6 by the moderation feeling without directly visually observing the operated section 6. Therefore, for example, the driver can operate the operated section 6 without moving the line of sight.

Figure 5:
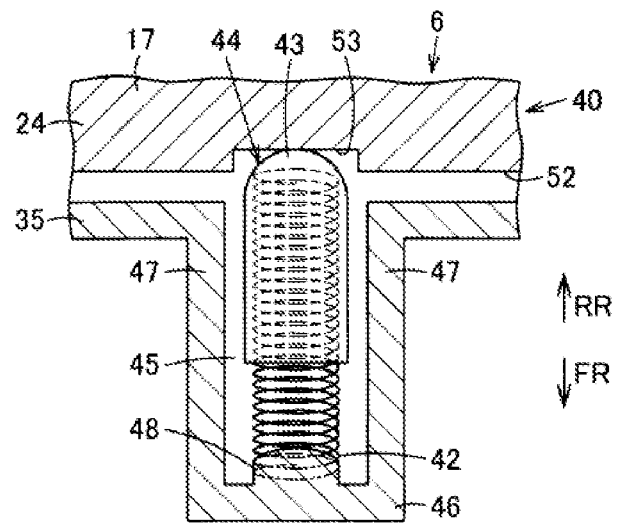
FIG. 5 is a cross-sectional view showing a moderation feeling adding apparatus according to a second embodiment of the present invention.

Next, a second embodiment will be described with reference to FIG. 5. The same components and operations as those of the first embodiment are designated by the same reference numerals, and the description thereof will be omitted.

In a moderation feeling adding apparatus 40 of the present embodiment, a holding section 48 for holding a spring 42 is a projection portion. The holding section 48 is a support wall portion 46 forming a bottom portion of a hole portion 45, and is a projection portion protruding rearward from a substantially central portion of the hole portion 45. The holding section 48 is inserted or press-fitted into the other end portion of the spring 42 to hold the spring 42.

As described above, the second embodiment has configurations similar to those of the first embodiment such as the position of the spring 42 being regulated by the holding section 48 in at least the predetermined direction which is the operating direction of the base section 17 and the clearances CL between the contact section 43 and the wall portion 47 on the one side and the other side in the predetermined direction being substantially equal to each other. Accordingly, the moderation feeling adding apparatus 40 can be easily assembled, a favorable moderation feeling can be added, and thus, the same operation and effect as those of the first embodiment can be obtained.

Further, since the holding section 48 is formed of a projection portion, the position of the spring 42 can be regulated even when the periphery of the holding section 48, particularly the entire hole portion 45, is formed widely, and thus, the spring 42 and the contact section 43 can be more easily assembled.

In each of the above embodiments, the base section 17 as the operation section is integrally configured with the operated section 6, but the present invention is not limited to this, and the base section 17 may have any one as long as it is operated to the one side and the other side in the predetermined direction in conjunction with the operation of the operated section 6.

Further, the operation section may have a rotation shaft in the right-left direction or the up-down direction. In this case, the spring 42 and the contact section 43, that is, the plunger 44 can be operated in the same manner as in each of the above-described embodiments by arranging them in the direction parallel to the rotation shaft.

Further, the operation section is not limited to a rotating section as long as it can be operated to the one side and the other side in a predetermined direction, and may be a reciprocating section.

The wall portion 47 is not limited to surrounding the entire circumference of the spring 42 and the contact section 43, and may be located at least face to the contact section 43 on the one side and the other side in the predetermined direction which is the operating direction of the operation section.

The operation apparatus 5 sets the operation of the fin 4 of the wind direction adjusting apparatus 1, but the operation apparatus 5 is not limited to this, and may set the operation of any apparatus.

The operation apparatus 5 is not limited to operating another apparatus as long as the operated section 6 is operated by the user.

Further, the operation section is conjunction with the operation of the operated section 6, but the present invention is not limited to this, and may be applied to any operation section that operates on the one side and the other side in a predetermined direction.

That is, the moderation feeling adding apparatus 40 can be applied to any apparatus including the spring 42, the contact section 43 (plunger 44), the base section 17 (operation section), the wall portion 47, and the holding section 48.

INDUSTRIAL APPLICABILITY

The present invention can be suitably used, for example, as an apparatus for adding a moderation feeling to an operated section for operating a wind direction adjusting apparatus for air conditioning of an automobile.

REFERENCE SIGNS LIST

17 Base section that is operation section
40 Moderation feeling adding apparatus
42 Spring
43 Contact section
45 Hole portion
47 Wall portion
48 Holding section
CL Clearance

What is claimed is:

1. A moderation feeling adding apparatus comprising:
an operation section that operates to one side and the other side in a predetermined direction;
a spring;
a contact section that is attached to the spring and capable of being in contact with the operation section;
a holding section that holds the spring; and
a wall portion that faces the contact section in the predetermined direction and generates a sound which becomes a moderation feeling by a collision between the wall portion and the contact section moved by a biasing force of the spring as a contact state between the contact section and the operation section changes due to an operation of the operation section,
wherein the spring is disposed between the contact section and the holding section,
the holding section regulates a position of the spring at least in the predetermined direction,
a clearance between the contact section and the wall portion is substantially equal between the one side and the other side in the predetermined direction in a state where the spring is upright,
the holding section is a recessed portion into which an end portion of the spring is inserted, and
an opening side of the recessed portion is widened in a tapered shape toward a wall portion side.

2. The moderation feeling adding apparatus according to claim 1,
wherein the wall portion is a side wall of a hole portion where the spring and the contact section are disposed, and
the holding section holds the spring in a substantially central portion of the hole portion.

3. The moderation feeling adding apparatus according to claim 1,
wherein the holding section is a projection portion inserted into an end portion of the spring.

4. The moderation feeling adding apparatus according to claim 1,
wherein the spring is in direct contact with the holding section.

* * * * *